Aug. 21, 1923.
B. E. ELDRED ET AL
1,465,601
PROCESS AND APPARATUS FOR THE MANUFACTURE OF CHLORHYDRINS
Filed May 3, 1918
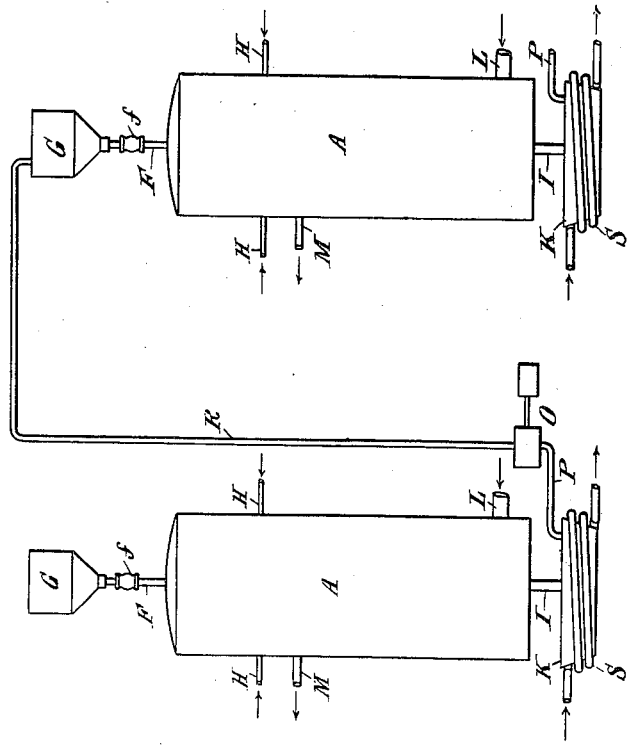
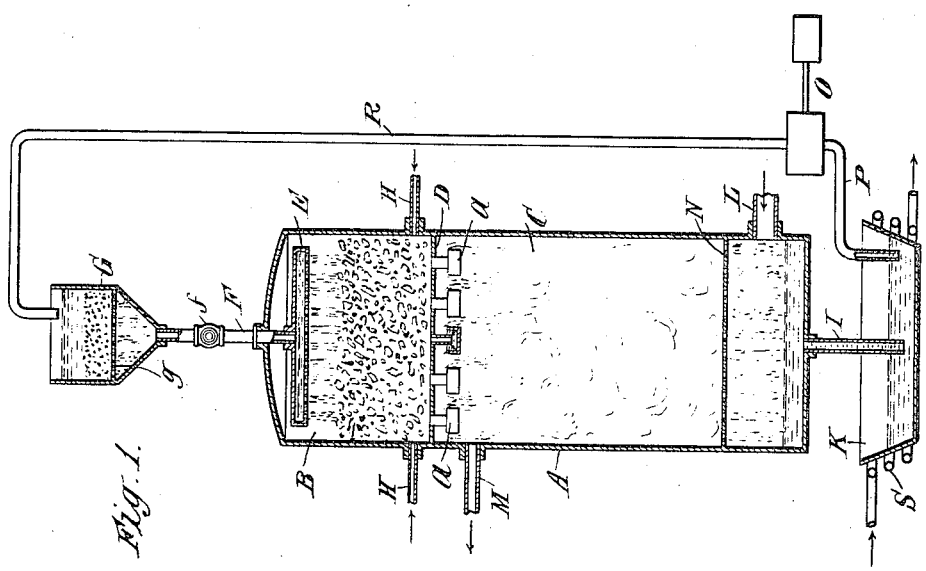
Inventors:
Byron E. Eldred
Benjamin T. Brooks
by his Attys:

Patented Aug. 21, 1923.

1,465,601

UNITED STATES PATENT OFFICE.

BYRON E. ELDRED, OF NEW YORK, AND BENJAMIN T. BROOKS, OF BAYSIDE, NEW YORK, ASSIGNORS, BY MESNE ASSIGNMENTS, TO CARBIDE AND CARBON CHEMICALS CORPORATION, A CORPORATION OF NEW YORK.

PROCESS AND APPARATUS FOR THE MANUFACTURE OF CHLORHYDRINS.

Application filed May 3, 1918. Serial No. 232,228.

*To all whom it may concern:*

Be it known that we, BYRON E. ELDRED, residing at New York city, county of Queens, State of New York, and BENJAMIN T. BROOKS, residing at Bayside, county of Queens, State of New York, citizens of the United States, have invented certain new and useful Improvements in Processes and Apparatus for the Manufacture of Chlorhydrins, fully described and represented in the following specification and the accompanying drawings, forming a part of the same.

This invention relates to improvements in process and apparatus for the manufacture of chlorhydrins and particularly chlorhydrins of the gaseous olefines.

The objects of the invention are to provide a process which can be carried out in a relatively compact apparatus, thereby keeping down the plant cost, while at the same time the quantitative production is high and the quality good.

A further object of the invention is to provide a process by which a strong solution of chlorhydrin can be obtained, thereby reducing the expense of subsequent concentration.

With these general objects in view the invention comprises a process by which an unsaturated hydrocarbon or mixtures of such hydrocarbons, in gaseous state, is or are subjected to the action of hypochlorous (or hypobromous) acid in the presence of a reagent capable of reacting with hydrochloric (or hydrobromic) acid but not to any great extent with the hypochlorous (or hypobromous) acid.

Furthermore in the preferred embodiment of the invention, the solution of chlorhydrin first formed is not at once separated from the other materials but the mixed solution is again treated to form more chlorhydrin, whereby the strength of the chlorhydrin solution is increased to the desired point.

The invention also comprises an apparatus especially suitable for carrying out the process.

In the drawings:—

Figure 1 is a diagrammatic view illustrating one form of apparatus for carrying out the process.

Figure 2, a similar view of another form of apparatus, for carrying out the process in a modified form.

In one form of the new process, the starting material is an unsaturated hydrocarbon which, in a gaseous condition, is brought into contact with a solution of hypochlorous acid in the presence of a reagent which will remove hydrochloric acid, but not hypochlorous acid.

While various reagents may be employed for this purpose, the salts of weak acids which are readily displaced by HCl but not by HOCl are best. Such salts are the carbonates and bicarbonates, salts of weak organic acids, such as acetates, and particularly, the borates. Also certain partially neutralized salts of strong acids also function as weak acids, for example disodium phosphate $Na_2HPO_4$.

It is advantageous to employ such salts as are readily soluble, but other salts which are only sparingly soluble may be used, as, for example, calcium borate, or calcium carbonate in some reactive form such as soft limestone or pressed blocks of precipitated chalk.

When chlorin is passed into water there results a mixture of the following substances in equilibrium: water, chlorin, hydrochloric acid, and hypochlorous acid. Such chlorin water is not suitable for the preparation of chlorhydrins, owing to the very large proportion of free chlorin and very small concentration of hypochlorous acid. If, however, a salt of a very weak acid is present, the hydrochloric acid reacts with the salt and is thus removed from the reaction mixture, but hypochlorous acid possesses such feeble acid properties that it is practically non-reactive to salts of other weak acids, such as carbonic acid, boric acid, etc., as hereinafter more fully set forth. The result therefore of reacting upon chlorin water with a salt of a weak acid is to eliminate the free hydrochloric acid, and since the free hydrochloric acid is eliminated, the reaction of chlorin and water proceeds practically to completion, so that the net result is a solution containing practically no free hydrochloric acid or free chlorin, but does contain free hypochlorous acid, the chlorin salt of the base originally added in the form of the weak acid salt, and the very weak acid added in the form of its salt. We do not limit ourselves to this explanation of the result, but simply note it as a fact.

It is important to maintain an excess of the salt in the solution in order that the conversion of chlorin into hydrochloric acid and hypochlorous acid will be complete, thus protecting the chlorhydrins from the action of free chlorin.

The soluble chlorides which accumulate in the solution facilitate subsequent separation of the chlorhydrin by distillation or extraction with a suitable solvent such as for example, ether, gasoline or carbon tetrachloride.

After the solution of hypochlorous acid has been acted upon by the unsaturated hydrocarbon in gaseous state, as for example, by gaseous olefines, there results what may be termed a mixed solution containing chlorhydrins and soluble chlorides.

Where the weak acid is itself soluble this also remains in the solution. When carbonates are employed most of the carbonic acid passes off as a gas, but when borates are used the boric acid remains in the solution.

In the latter case, the mixed solution or mixture of solutions may first be treated to separate out the boric acid. This may be done advantageously by chilling the solution to precipitate the boric acid, after which the supernatant liquor is drawn off and the chlorhydrins recovered therefrom, as for example, by distillation in a suitable still or by extraction, as hereinbefore suggested.

As thus far described the process gives a dilute solution of chlorhydrin up to the time of separating out the chlorhydrin.

An important feature of the invention consists in a modification of the process by which a more concentrated solution of chlorhydrin is formed.

In this modification, the mixture of solutions, while still containing the chlorhydrin, is treated to regenerate hypochlorous acid therein, as for example, by leading chlorin into contact with it, and is again brought into contact with unsaturated hydrocarbon in gaseous state in the presence of more salt of a weak acid, so that a further increment of chlorhydrin is formed. This series of steps may be repeated until a chlorhydrin solution of the desired strength is obtained, after which the mixed solution may be treated to recover the chlorhydrin in the manner hereinbefore explained.

The invention will be more fully explained hereinafter in connection with the description of the apparatus.

Referring to Figure 1 of the drawings, A is a receptacle of any desired form, in the present instance illustrated as in the nature of a tower device. The receptacle has an upper compartment or chamber B which serves as a mixing or combining chamber for the production of a solution capable of evolving hypochlorous acid (HClO). This chamber is so separated from the lower chamber C of the receptacle as to permit a flow of liquid from the upper chamber B to the lower one C while at the same time preventing the escape of gas from the lower chamber to the upper one.

In the present instance the upper chamber is separated from the lower by a partition D provided with a plurality of liquid sealed openings indicated at $a$ which advantageously are well distributed in the partition so that the liquid passing through the openings will form a shower of liquid into the lower chamber.

Within the upper chamber and in the present instance at the upper part thereof is located a spraying device indicated at E which is arranged to be supplied by a pipe connection F, controlled by a valve $f$, with a suitable solution from a receptacle G, as more fully explained hereafter. The receptacle G is provided with a perforated diaphragm $g$, to hold salt of a weak acid.

The upper chamber B is provided with means for supplying it with halogen gas, for example chlorin, this means in the present example, comprising one or more inlet pipes H opening into the chamber B a short distance above the partition D.

The lower chamber has a receptacle for liquid at its bottom to which receptacle is connected a liquid outlet pipe I arranged to dip beneath the liquid in a liquid holder or tank K so that said outlet will be sealed against the entrance of air or the escape of gas from the lower chamber.

The lower chamber is also provided near its bottom with an inlet for gaseous hydrocarbons as indicated at L and with an outlet for gas at a point near the upper end of the lower chamber, as indicated at M. Advantageously a perforated partition N is located above the inlet L to serve as a distributor for the ascending gas.

Means is provided for withdrawing liquid from the tank K and distributing it to a point for further use or treatment.

In the example illustrated in Figure 1 this means consists of a pumping apparatus with suitable pipe connections, the pump being indicated at O, the suction pipe at P and the discharge pipe at R, which is arranged to discharge into the receptacle or hopper G.

Suitable means for cooling the tank K is provided. In the drawing this means is indicated as a cooling coil S, through which a suitable cooling fluid may be circulated.

The operation of the apparatus thus far described is as follows:—

In the receptacle G on the perforated partition or screen $g$ is placed a charge of a suitable salt of a weak acid. In the present description it will be assumed that this is borax. Water is supplied until a saturated solution of the borax is formed Then the valve $f$ is opened to allow the saturated solution to pass to and through the sprayer E into the chamber B.

During the admission of the solution into the chamber B chlorin gas is admitted through the inlets H. The gas flows in opposite direction to the movement of the solution and thereby the two are brought into intimate contact with each other.

In order to increase the contact surface of the gas and liquid as well as the time of travel together, the chamber B may be provided with a suitable packing or mass of aggregate of broken or granular material. Advantageously this packing may be of reactive material such for example, as sparingly soluble salts such as calcium borate, or calcium carbonate, or, if desired, a mixture of such materials. If calcium carbonate is used, it is advantageous to employ it in the form of soft limestone or pressed blocks of precipitated chalk.

The chlorin and the water of the solution combine to form hypochlorous acid, while the hydrochloric acid which would simultaneously be formed is at once bound with the base, thus insuring a good yield and continuous production of hypochlorous acid.

The resulting solution of hypochlorous acid accompanied by borax solution flows through the liquid seals at the bottom of the chamber B and enters the chamber C, falling downward in a well distributed shower.

To the chamber C is admitted the unsaturated hydrocarbon in gaseous state. In the apparatus shown, the gaseous unsaturated hydrocarbon enters through the inlet and flows upward in opposite direction to the descending solution, and in intimate contact therewith.

The hypochlorous acid reacts with the unsaturated hydrocarbon to form a chlorhydrin of such hydrocarbon. Any excess of gaseous hydrocarbon which is unacted upon passes out through the outlet M.

The chlorhydrin formed falls as a liquid, is caught at the bottom of the tower and flows out through the outlet into the tank or receptacle K, accompanied by and dissolved in the solution of soluble salt of a weak acid, if any remains unacted upon, and with the soluble chlorides and boric acid. That is to say, the tank K receives a mixed solution of reaction products containing chlorhydrin of the unsaturated hydrocarbon employed.

The process is particularly intended for the production of a chlorhydrin of an olefine as for example, ethylene or propylene chlorhydrin. In such cases the corresponding gaseous olefine may be admitted to the bottom of the tower.

Instead of a substantially pure olefine being employed, the gas admitted may be a mixture of gases, for example, saturated and unsaturated hydrocarbons, in which case the saturated gases will not be acted upon, but will serve merely as a diluent and pass off unchanged through the gas outlet of the chamber C.

Furthermore, the mixture may comprise a plurality of unsaturated hydrocarbons, for example, an olefine and an acetylene, or a mixture of different olefines. In the latter case, a mixture of chlorhydrins will result, which mixture has valuable properties in the arts, particularly as a solvent for many substances, such, for example, as varnish. The mixed chlorhydrins may, however, be subsequently separated.

Where such a mixture of chlorhydrins is to be made by the process described, the mixture containing unsaturated olefines may be the result of a destructive distillation process. For this purpose petroleum products or alcohol may be destructively distilled under conditions which will give a gas rich in olefines, and this gas after any desired treatment to remove condensable matters may be led into the apparatus for treatment by the process described. Where ethyl alcohol is employed to produce ethylene the resultant gas mixture will comprise principally ethylene, but if used without purification, this ethylene will generally be accompanied by hydrocarbons of the paraffine series, as for example, methane, and by some hydrogen, and under some conditions ether vapor.

When petroleum products are destructively distilled under the best conditions, the gas mixture will comprise an important percentage of olefines, which will be chiefly ethylene and propylene. This gas is accompanied by gases of the paraffine series.

Such gas makes an economical starting material for the production of chlorhydrins by the present process. The propylene will be attacked in advance of the ethylene and hence the process can be operated to convert practically all of the propylene into chlorhydrin while allowing most of the ethylene to pass out of the apparatus with the gases of the paraffine series. This escaping gas mixture may be again treated by the process in a separate apparatus to convert the ethylene into its chlorhydrin. In this way a separate formation of the two chlorhydrins is possible. In practice, however, it is advantageous to construct the apparatus of such size and so control the inlet and outlet of gas that both the propylene and the ethylene are acted upon in the one apparatus. This results in a mixture of chlorhydrins, which as before explained, are useful as a mixed solvent. However, by suitable control of the process of distillation, the propylene and ethylene chlorhydrins may be separated from each other.

The mixture of solutions which are caught in the tank K may be treated to remove the boric acid. This may be done advantageously by cooling the said mixture until the boric acid precipitates. In order to accomplish this conveniently the liquid may be cooled while still in the tank K, by the use of the cooling coils S. The boric acid may be removed from time to time.

The supernatant liquid, which is a mixture of soluble chlorides and chlorhydrin, may then be removed from the apparatus and treated to recover the chlorhydrin, as for example, by distillation or extraction as hereinbefore explained.

But, as this solution of chlorhydrin made by one passage through the apparatus will be relatively weak, an important feature of the invention consists in further treatment of the liquid by which more chlorhydrin will be formed therein.

In the apparatus shown in Fig. 1, the liquid from the tank K, substantially free of boric acid, is pumped to the receptacle G and again passes through the apparatus to be treated anew in the same manner as described in connection with the original solution of borax.

Because of the presence of an excess of the salt of a weak acid, the chlorhydrin, on its passage through the upper chamber B is protected against the action of the chlorin upon it, and hence is not affected, or at least not to a material extent. The mixed solution, charged with borax, is acted upon by the chlorin to regenerate hypochlorous acid in it and then flows into chamber C when the hydrocarbon gas contacts with it to produce more chlorhydrin.

With each passage of the liquid from tank K through the apparatus the chlorhydrin solution is strengthened until at the desired concentration the liquid is passed to a still or extracting apparatus for treatment to recover the chlorhydrins.

Instead of passing the liquid from the tank K back through the same apparatus, it may be sent to a similar apparatus for a second treatment and thence to a third apparatus, and so on. In Fig. 2 is illustrated the first and second apparatus of such a series.

What is claimed is:

1. The process of making chlorhydrins, which consists in preparing a mixed solution of hypochlorous acid and borate, contacting an unsaturated hydrocarbon in gaseous state with said mixed solution, whereby chlorhydrin, soluble chloride and boric acid are formed, treating the resultant solution to remove the boric acid, and finally recovering the chlorhydrin.

2. The process of making chlorhydrins, which consists in preparing a mixed solution of hypochlorous acid and borate, contacting an unsaturated hydrocarbon in gaseous state with said mixed solution, whereby chlorhydrin, soluble chloride and boric acid are formed, chilling the solution to precipitate the boric acid, separating the liquid from the precipitate, subjecting the liquid to the action of chlorin to regenerate hypochlorous acid therein, adding a further charge of borate to the solution, subjecting it to contact with an unsaturated hydrocarbon in gaseous state to form more chlorhydrin therein, chilling the solution to precipitate the boric acid, and finally recovering the chlorhydrin from the solution.

3. In an apparatus for the manufacture of halohydrins, the combination with a compartment having an inlet for halogen gas, means for spraying a solution into contact with said halogen gas and a liquid-sealed liquid outlet for the resultant solution, of a compartment arranged to receive said resultant solution, means for supplying an unsaturated hydrocarbon in gaseous state to the latter compartment to contact it with said resultant solution, and means for removing liquid from the latter compartment.

4. In an apparatus for the manufacture of halohydrins, the combination with a compartment, means for supplying a halogen gas to said compartment, means for showering a solution into contact with the halogen gas, a second compartment, means for passing the resultant solution from the first compartment to the second, means for supplying an unsaturated hydrocarbon in gaseous state to said second compartment to contact it with the said resultant solution, means for removing liquid from the second compartment, means for charging said liquid with a reagent, means for bringing said charged liquid into contact with a halogen gas, and means for bringing the resultant liquid into contact with an unsaturated hydrocarbon in gaseous state.

In testimony whereof, we have hereunto set our hands.

BYRON E. ELDRED.
BENJAMIN T. BROOKS.